Feb. 19, 1963  R. N. BOONSTRA  3,078,020
HORTICULTURAL CARRYING APPARATUS
Filed April 4, 1962
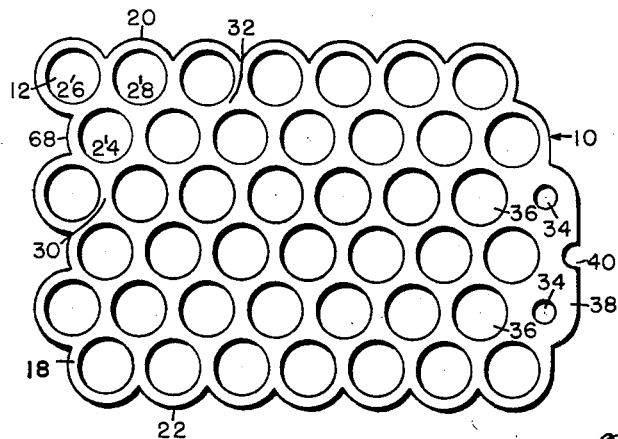
FIG. 1
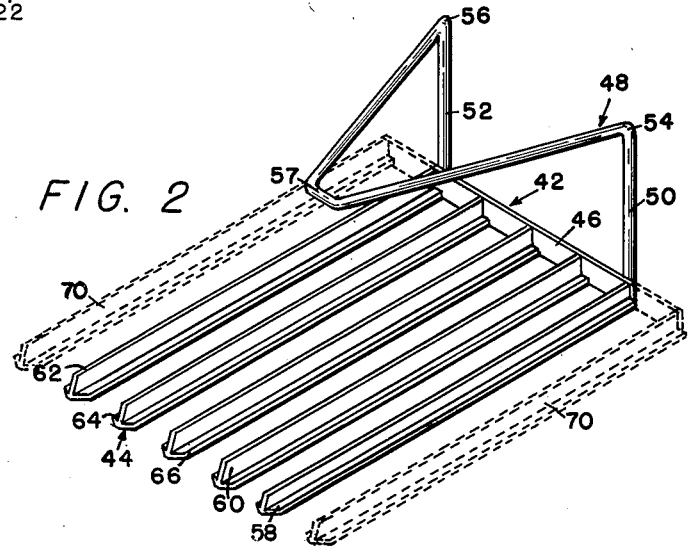
FIG. 2
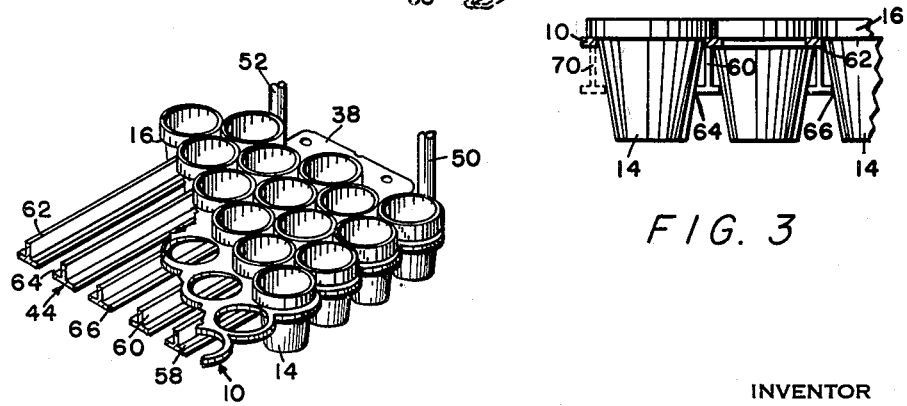
FIG. 3
FIG. 4
INVENTOR
RICHARD N. BOONSTRA
BY
*Roy Davis*
ATTORNEY

United States Patent Office 3,078,020
Patented Feb. 19, 1963

3,078,020
HORTICULTURAL CARRYING APPARATUS
Richard N. Boonstra, 6704 Heisley Road,
Painesville, Ohio
Filed Apr. 4, 1962, Ser. No. 185,065
2 Claims. (Cl. 224—45)

This invention relates generally to the production of plant cuttings, seedlings, and the like, and more particularly to the handling of plant pots not only when empty, but also when they contain soil and growing plants, and the equipment therefor.

It is common practice in the field of horticulture to produce plants from cuttings, slips, and the like, as well as from seeds. Cuttings or slips are detached pieces of plants taken from growing plants for the purpose of producing additional plants. Cuttings may be inserted in a medium such as sand which has been placed in flats, in trays, or on a bench to a depth sufficient to receive these cuttings. After a time, under proper conditions of temperature and humidity, roots will be produced. In any case, such rooted cuttings, slips, or seedlings are commonly grown for a time in some form of plant pot.

Plant pots are of three general types, the best known being clay pots which may be cleaned after use and reused. Another popular type is the peat pot which is pressed and molded from spaghnum peat and a binder such as wood fiber or paper pulp. It is not intended that the plant be removed from the peat pot, but rather that the roots penetrate the pot wall after planting plant and pot in the ground. A third type of pot which is particularly adaptable to certain types of plants is the plastic pot.

All three types of plant pots are available in the familiar conical-frustum shape. The clay pots are available in this shape only and normally are provided with a cylindrical collar at the top or mouth of the pot. The peat pots may be either conical-frustum, i.e., circular in section, or pyrimidal-frustum, i.e., square in section. The peat pots do not have a collar such as the clay pots, but instead, taper uniformly from base to top. Plastic pots are also either square or circular in section and may or may not have a collar around the top.

In commercial greenhouses, not only must empty pots sometimes be placed for filling with soil, as for example, when planting small seedlings with a dibble, but filled pots, from the time of filling (potting), until the grown plant is sold to a customer or removed from the pot for transplanting in the soil, must be moved several times. Such moving is necessary to provide better conditions of temperature, light, or humidity; to move plants to cold frames, which is generally done to gradually adapt them to outdoor conditions, a process referred to as "hardening off"; to move plants back to the potting bench for shifting to a larger size pot; to move planting stock to the fields; and to move plants to a packaging or sales area.

At the present time, moving of the potted plants must be done by hand. Frequently, a group of pots may be moved by means of a tray or flat, but manual handling is involved in placing the pots in the flat and removing them from the flat at the new location. The flats, being made of wood, are relatively expensive for this use, and since the highly humid atmosphere required by the plants during at least a part of their growing period causes the flat to deteriorate, the potted plants are not left in the flat.

A person can easily handle many plant pots at one time when they are empty, but as soon as plants are growing therein, it becomes almost impossible for a person to handle more than two at a time, i.e., one in each hand. It is therefore quite evident that the present method of handling potted plants is highly inefficient and expensive.

A primary object of this invention is to provide an apparatus whereby a plurality of empty or filled plant pots may be handled at one time.

Another object of this invention is to greatly increase the efficiency of a person handling plant pots whether empty or filled.

According to this invention, a lattice is provided to retain a plurality of plant pots in longitudinal rows such that they form a nest of pots occupying a minimum area of space. A carrier or lifter having projecting arms to fit between adjacent rows of pots and transfer the nest of pots from one location to another is also provided.

Other objects of this invention will become apparent from a careful consideration of the following specification and the attached drawing in which:

FIGURE 1 is a top view of one version of the lattice in accordance with the teachings of this invention.

FIGURE 2 is a perspective view of a typical carrier or lifter.

FIGURE 3 is a sectional view of the lattice and carrier in operational position with a plurality of clay pots shown in position in the lattice.

FIGURE 4 is a sectional perspective view of the carrier, lattice and pots.

Turning now to FIGURES 1, 3 and 4, there is shown a lattice 10 which is made of such a material and having such a thickness so as to afford sufficient rigidity to retain a plurality of plant pots in the desired nested arrangement. The thickness of lattice 10 is not significant and is dependent for the most part upon the material of construction. It is preferred that the lattice be as thin as possible commensurate with the moderate rigidity necessary. The lattice may be constructed of such materials as plastic, sheet aluminum, galvanized metal, wood or other suitable material which will not be harmfully affected by moisture.

The lattice shown in FIGURE 1 is provided with circular openings 12 to accommodate the customary round plant pots. The diameters of circular openings 12 of a particular lattice are substantially equal i.e. the pots which will fit therein will all be of the same nominal size. The openings have a circumference slightly larger than that of the outside circumference of the conical portion of pot 14 just below pot shoulder 16 so that the pot fits loosely in the opening when the bottom edge of pot shoulder 16 is resting on the top surface 18 of the lattice. It may be noted that the diameter of opening 12 is approximately the same as the inside diameter of the pot at its top or mouth. Since the lattice is intended to accommodate plant pots all of which are the same size, the size of openings 12 and correspondingly the overall dimensions of lattice 10 will vary according to size of the pot being used.

As pointed out above, the pot fits loosely in the opening rather than being a tight or press fit. The clearance between the outer surface of the pot and the inner surface of the opening makes allowance for the slight variation of size encountered in the manufacture of such pots. Also when carrier 42, shown in FIGURES 2, 3 and 4, is not in the operating position shown in FIGURES 3 and 4, the lattice will fall free of the upper portion of the pots and will lie upon the surface upon which the pots are sitting. In this way, the lattice permits more compact nesting of adjacent nests of pots than would be possible if the lattice remained in a fixed position on the upper portion of the pots since the foremost pots of the second nest can be placed on top of any projecting portion of the first lattice rather than having to be spaced from the first nest by the width of the projecting portion.

The openings are arranged in longitudinal rows which are generally parallel to each other and to edges 20 and 22 of the lattice. Alternating rows of openings are offset with respect to adjacent rows to the extent that the center 24 of the first opening of the alternate row is approximately midway between centers 26 and 28 of the first and second openings respectively of the adjacent or end row. This staggered positioning permits more compact nesting since the shoulders of pots in one row will partially fit between the shoulders of pots in adjacent rows. The spacing between adjacent openings in a longitudinal row provided by interconnecting web 30 will be such that the shoulders of pots in adjacent openings will be in close juxtaposition, i.e., the pot shoulders may touch but will not fit tightly against each other. Web 32 between openings in adjacent transverse rows will have substantially the same width as web 30. Thus, it is apparent that the width of webs 30 and 32 at their narrowest points will be equal to or slightly greater than twice the width of pot shoulder 16. A nest of pots positioned in this manner by the lattice will occupy a minimum area.

The centers of openings in alternate longitudinal rows, as well as the openings themselves, form transverse rows which are parallel to each other as shown in FIGURE 1. Transverse rows formed by the openings of the even numbered longitudinal rows will be approximately midway between transverse rows formed by pairs of adjacent openings in odd numbered longitudinal rows.

The term "longitudinal" as used throughout the specification and the appended claims is intended to mean a direction parallel to edges 20 and 22 of the lattice. The term "transverse" is intended to mean a direction perpendicular to the longitudinal direction, i.e., from edge 20 to edge 22. The term "nest" refers to a plurality of plant pots positioned by the lattice.

Since it is desired that all of the lattices used may have the same configuration, lattice 10 is preferably provided with an even number of rows. Such a configuration provides easy grouping or nesting of any number of nests of pots both at the sides and ends.

The lattice of FIGURE 1 is also provided with extending end portion 38 containing finger holes 34. These finger holes have a smaller diameter than openings 12, the only requirement being that the finger holes are large enough for insertion of at least a portion of a person's finger. Finger holes 34 serve a dual purpose. First, as hereinafter more fully described, they aid in insertion and removal of the carrier. Secondly, these holes provide a drainage means for pots positioned on the extended end portion of the lattice.

The center of each finger hole 34 lies on the extension of a line passing through the centers of openings 12 comprising a longitudinal row. Also the distance between the center of the finger hole and the center of opening 36, which is adjacent to it in the same longitudinal row, is substantially the same as the distance between centers of any two adjacent openings.

As previously indicated, nests of pots may be placed in juxtaposition to and nested against another nest of pots on all four sides. When a nest of pots is placed on a bench or other surface and a second nest abutted against the first nest in a longitudinal direction, at least a portion of some of the foremost pots of the second nest will be positioned upon the extending end portion of the lattice employed with the first nest of pots. With the finger holes positioned as previously indicated, drain holes in the bottoms of the pots of the second nest will automatically be placed above the finger holes of the first lattice. In this way, free drainage of those pots resting on a portion of the lattice is assured.

Depending upon the width of extending end portion 38 of the lattice, a portion of an opening may be provided, as shown at 40, so that the drain hole of a pot resting on this portion of the lattice is not partially blocked.

Carrier 42 as shown in FIGURE 2 comprises a plurality of parallel arms 44 which are substantially equidistant apart. These arms project longitudinally from bar 46 to which they are attached by welding, nuts and bolts, rivets or other suitable means.

Also attached to bar 46 is handle 48 which comprises handle members 50 and 52 extending vertically upwardly to points 54 and 56. These points should be a sufficient distance above arms 44 to provide ample clearance for the foliage of growing plants. From points 54 and 56 the handle members extend generally horizontally above arms 44 and coverge to form a hand bar 57 which is at a point near the center of gravity of an assembly of carrier, lattice and pots filled with dirt. Rather than being positioned at the exact center of gravity, it is preferred that the hand bar be slightly further away from the closed end where arms 44 are affixed to bar 46. In lifting and/or carrying a nest of filled pots, the carrier is grasped by the hand bar 57. Positioning the hand bar slightly ahead of the center of gravity toward the open end of the arms causes the open end of the arms to be elevated during lifting and carrying and thus helps to prevents the nest of pots from slipping off the carrier.

As shown in FIGURES 2 and 3, arms 44 are preferably of inverted T shape with horizontal portion 58 of the T at the lower side and vertical portion 60 extending vertically upwardly therefrom. These equally spaced arms are so arranged that they will fit between adjacent longitudinal rows of pots as positioned in the lattice. The lengths of horizontal portion 58 and vertical portion 60, respectively, are related and interdependent so that with lattice 10, containing a plurality of pots, resting on the upper surface 62 of vertical portion 60, opposite sides 64 and 66 of horizontal portion 58 will be in contact with the outer surface of the conical portion of pots in adjacent rows. The total height of arms 44, including the thickness of horizontal portion 58 and the height of vertical portion 60, should be substantially less than the vertical distance between the lower side of lattice 10, when it is in position at the upper portion of the pot, and the bottom of the pot. Having such a height, the carrier may be easily inserted and removed from a nest of pots. In the embodiment shown in FIGURE 2, carrier 42 is provided with a number of arms 44 which is one less than the number of longitudinal rows of openings in lattice 10.

The arms 44 are preferably of a length such that when the carrier is inserted completely under the lattice as shown in FIGURE 4, they will not extend beyond front edge 68 of the lattice. If the arms project beyond this front edge they may interfere with the proper placing of the next nest of pots against the end of the nest all ready in position on the bench or such.

As previously indicated, the lattice may be constructed of various types of material having different degrees of rigidity. If the lattice is made of plastic material, e.g., low density polyethylene or materials of similar rigidity, it is desirable to provide the pattern of openings 12 as shown in FIGURE 1. If the lattice is made of more rigid material, such as sheet metal or the like, a row of openings around the perimeter of the lattice will suffice and the center can be a large opening without the interconnecting webs. The arms 44 projecting between the rows of pots will support the pots in the large open center and prevent them from falling while the nest is being transferred from one location to another. Also, while finger holes 34 aid in inserting and withdrawing the handle, they may be eliminated by removing the end portion 38 and forming both ends of the lattice to have a similar configuration.

Lattice 10 may alternatively be provided with square openings to accommodate pots having a square section. In this case, however, the openings in the rows will not be staggered as with the circular openings but instead will form longitudnial and transverse rows which are perpendicular to each other. This arrangement will occupy a minimum area. Finger holes 34 are not required in a lattice to accommodate square pots since the end will be straight and the foremost pots of a second nest will fit against those of the first nest rather than some of the pots of the second nest resting on the top surface of the lattice.

Carrier 42 is also subject to modification without departing from the intent of this invention. End arms 70 may be provided and are desired in some instances. End arms 70 furnish additional support if sides 64 and 66 of arms 44 do not fit against the sides of the pots in adjacent rows. The end arms 70 are also desired if lattice 10 is provided with square openings since in this case sides 64 and 66 of the arms may not fit against the sides of the pots.

The carrier may also be provided with less arms if lattice 10 is constructed of a material of sufficient rigidity so that the lattice will form a bridge across the existing arms.

As previously indicated, a lattice having the proper size openings will accommodate but one size plant pot, i.e., pots having the same diameter, so that a different size pot necessitates a lattice also having different size openings. In addition, carriers having rigidly affixed arms with fixed spacing between the arms are anticipated so that carriers having different spacings are used for the different size pots. The need for a variety of carriers can be eliminated by attaching the arms to bar 46 in such a manner that the spacing can be adjusted. By way of example, this can be accomplished by providing an elongated slot in bar 46 and having angular ends on the arms which are attached to the bar by bolts and nuts and may be moved to provide the spacing desired.

A further modification of the carrier may reside in the cross-sectional configuration of the arms. Instead of the inverted T shape shown, the arms may be triangular in shape and fulfill the same purpose as the T shaped arms. Also the arms may be round or rectangular in shape. End arms 70 must be provided if the arms are round or rectangular since a three point contact cannot be maintained as with the inverted T shaped or triangular arms.

Handle 48 may be formed of a single member which is affixed to the center of bar 46 instead of the generally U shaped configuration shown in FIGURE 2. As with the handle of FIGURE 2, a single member would extend vertically upwardly for the desired distance and then would project forward to a point near the center of gravity of the nest of pots. A handle formed of a single member may also be provided with the hand bar for easier handling.

The following brief description will illustrate a method of using the apparatus of this invention. The lattice is placed on a convenient surface such as a bench. Since the pots are normally filled with soil and cuttings or slips placed in the pots by hand, a supply of pots, which may at present be in a lattice, is readily available. As each pot is filled it is placed so that the bottom of the pot is within one of the openings of the lattice. When all of the openings of the lattice have pots therein, the worker grasps the carrier by the handle and lifting the lattice by inserting his fingers in the finger holes, inserts the arms of the carrier under the lattice and between the rows of pots. The nest of pots is now ready to be transferred to the desired location merely by lifting the carrier, with the lattice and pots resting thereon, by the handle and carrying it to the new location. To remove the carrier from the nest of pots, the worker again inserts his fingers in the finger holes of the lattice and holding the lattice and pots in position, slides the carrier from under the lattice. The lattice will then fall free of the upper portion of the pots and will lie on the surface on which the pots have been placed. A second nest of pots is prepared and transferred to the new location in the same manner. The foremost pots of the second nest are placed on top of end portion 38 of the first lattice and the second nest is nested against the first nest.

An overhead conveyor provided with hooks may be used for transferring a nest of pots from one location to another. The carrier with a nest of pots may be hung on the conveyor hook and be carried to the new location where it is taken off the hook and placed in the desired location. The empty carrier can be replaced on a hook if desired to be returned to the filling stand.

Having thus described the invention and the manner in which the same is to be employed, it is to be understood that the invention is not to be limited to the embodiments herein shown and described as the same is susceptible of variation and modification without departing from the spirit and intent of the invention and, therefore, the invention is only to be limited by the scope of the appended claims.

What is claimed is:

1. An apparatus for lifting and transporting a plurality of plant pots comprising a lattice having a plurality of openings of such size and configuration to accommodate plant pots therein, said openings forming substantially parallel longitudinal rows and substtanially parallel transverse rows, and a carrier having a plurality of substantially parallel arms which are approximately equidistant apart, said arms being free at one end and at the opposite end affixed to a transverse bar, and a handle extending upwardly from said bar, the arms being so spaced as to be capable of being inserted between longitudinal rows of plant pots located within said openings of the lattice.

2. Apparatus for transporting a plurality of conical-frustum shaped plant pots comprising a lattice containing a plurality of circular openings of substantially equal size arranged in parallel longitudinal rows, the openings of alternate longitudinal rows forming transverse rows, transverse rows containing the openings in one longitudinal row being approximately midway between transverse rows containing openings in adjacent longitudinal rows, interconecting web members of substantially equal width separating adjacent openings, the web members being of such a width that pots in adjacent openings are in juxtaposition to each other, and a projecting end portion containing finger holes, the centers of said finger holes being on an extension of a line passing through the centers of the openings of a longitudinal row, the spacing between the center of the finger hole and the center of the adjacent circular opening being approximately equal to the spacing between adjacent circular openings, and a carrier comprising a plurality of substantially parallel arms of equal length which are approximately equidistant apart, said arms being free at one end and at the opposite end affixed to a transverse bar, and a handle extending upwardly from said bar, said arms being of inverted T shaped configuration having a horizontal portion and a vertical portion and being spaced apart a distance such that each arm may be inserted between adjacent longitudinal rows of pots retaining within said lattice, the height of the vertical portion and the width of the horizontal portion of the arm being interdependent and of such height and width respectively that with the vertical portion in contact with the underneath side of the lattice opposite sides of the horizontal portion will be in contact with the tapered exernal surfaces of pots in the adjacent rows between which the arm is inserted, said handle comprising a member of generally U shaped configuration extending vertically upwardly to a point and extending horizontally from said point in a direction substantially parallel to said arms, said handle being spaced above the arms a sufficient distance to provide clearance for foliage of growing plants, said handle member terminating at a point slightly ahead of the center of gravity of an assembly of carrier, lattice and pots filled with dirt toward the open end of the carrier arms.

References Cited in the file of this patent

UNITED STATES PATENTS

| | | |
|---|---|---|
| 930,890 | Schlappich et al. | Aug. 10, 1909 |
| 1,742,384 | Fitzgerald | Jan. 7, 1930 |
| 2,295,860 | Oliver | Sept. 15, 1942 |
| 2,704,928 | Curry | Mar. 29, 1955 |
| 2,905,502 | Brown | Sept. 22, 1959 |